(12) United States Patent
Desanti

(10) Patent No.: US 8,817,656 B2
(45) Date of Patent: *Aug. 26, 2014

(54) DISCOVERY FOR FIBRE CHANNEL OVER ETHERNET DEVICES

(75) Inventor: Claudio Desanti, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 12/099,664

(22) Filed: Apr. 8, 2008

(65) Prior Publication Data

US 2009/0252181 A1 Oct. 8, 2009

(51) Int. Cl.
*G06F 15/173* (2006.01)

(52) U.S. Cl.
USPC .......................................... 370/254; 709/242

(58) Field of Classification Search
None
See application file for complete search history.

(56) References Cited

U.S. PATENT DOCUMENTS

| | | | | |
|---|---|---|---|---|
| 2003/0046706 | A1* | 3/2003 | Rakib | 725/111 |
| 2006/0098681 | A1 | 5/2006 | Cafiero et al. | |
| 2006/0251067 | A1* | 11/2006 | DeSanti et al. | 370/389 |
| 2008/0056300 | A1 | 3/2008 | Williams | |
| 2009/0132701 | A1* | 5/2009 | Snively | 709/224 |
| 2009/0161692 | A1* | 6/2009 | Hirata et al. | 370/466 |
| 2009/0245791 | A1* | 10/2009 | Thaler et al. | 398/45 |
| 2009/0292813 | A1* | 11/2009 | Snively et al. | 709/228 |
| 2010/0118771 | A1* | 5/2010 | Lee et al. | 370/328 |

OTHER PUBLICATIONS

Wilson, et al., "Fibre Channel Storage Area Network Discovery", Sep. 10, 1999, Brocade Communication Systems, Inc., Revision 3.5, pp. 1-20.*
Desanti et al., FIP VLAN Discovery, T11/08-564v0, Oct. 2008, pp. 1-6.
International Search Report mailed Oct. 29, 2009 for PCT Application No. PCT/US2009/038447.
Written Opinion mailed Oct. 29, 2009 for PCT Application No. PCT/US2009/038447.
U.S. Office Action dated Nov. 2, 2009, U.S. Appl. No. 12/114,680.
U.S. Office Action, Jun. 1, 2010 U.S. Appl. No. 12/114,680.
U.S. Office Action, Dec. 9, 2010, U.S. Appl. No. 12/114,680.
U.S. Final Office Action May 16, 2011, U.S. Appl. No. 12/114,680.
U.S. Office Action, Mar. 7, 2012, U.S. Appl. No. 12/114,680.
Chinese Office Action dated Apr. 17, 2012, CN Application No. 200980112417.4.
U.S. Office Action, Sep. 4, 2012, U.S. Appl. No. 12/114,680.
U.S. Office Action dated Feb. 7, 2013 in U.S. Appl. No. 12/114,680.
Chinese Office Action dated Jan. 7, 2013 in CN Application No. 200980112417.4.

* cited by examiner

*Primary Examiner* — Gregory Sefcheck
*Assistant Examiner* — Steve Young
(74) *Attorney, Agent, or Firm* — Fernando Hale & Chang LLP

(57) ABSTRACT

Techniques are provided for performing discovery in a Fiber Channel over Ethernet (FCoE) network. An FCoE Node (ENode) discovers the FCoE Forwarders (FCFs) connected to its network segment by transmitting a solicitation message to the multicast MAC address "All-FCF-MACs". All FCFs receive packets with this multicast MAC address including the solicitation message that announces the presence of the ENode. Each FCF replies with a unicast advertisement message that provides the ENode with a MAC address of the responding FCF. The ENode builds a list of the FCFs available on its network segment and may then establish a virtual link with one or more of the FCFs through a Fabric Login (FLOGI) exchange.

23 Claims, 16 Drawing Sheets

| Version 403 | FCoE Discovery Command Code 401 | Descriptor List Length 407 | |
|---|---|---|---|
| | Operation Code 405 | Flags 409 | FCF Flag (0) 411 |
| Type 421 | Length 423 | | |
| MAC Address Of Soliciting ENode 425 | | | |

Figure 4

| FCoE Discovery Command Code 501 | | |
|---|---|---|
| Version 503 | Operation Code 505 | Descriptor List Length 507 |
| | Flags 509 | FCF Flag 511 |
| Type 521 | Length 523 | |
| MAC Address Of Soliciting FCF 525 | | |
| Type 531 | Length 533 | |
| FC MAC Address Prefix (FC-MAP) 535 | | |
| Type 541 | Length 543 | |
| Switch_Name 545 | | |

Figure 5

| FCoE Discovery Command Code 601 | | |
|---|---|---|
| Version 603 | Operation Code 605 | Descriptor List Length 607 |
| | Flags 609 | Solicited Flag 611 |
| Type 621 | Length 623 | |
| MAC Address Of Originating FCF-MAC 625 | | |
| Type 631 | Length 633 | |
| FC MAC Address Prefix (FC-MAP) 635 | | |
| Type 641 | Length 643 | Switch_Name 645 |
| Type 651 | Length 653 | Fabric_Name 655 |

Figure 6

DISCOVERY FOR FIBRE CHANNEL OVER ETHERNET DEVICES

TECHNICAL FIELD

The present disclosure relates to discovery for Fibre Channel over Ethernet (FCoE) devices.

DESCRIPTION OF RELATED ART

Fibre Channel over Ethernet (FCoE) is a protocol that allows consolidation of Storage Area Networks (SANs) based on the Fibre Channel (FC) protocol over an Ethernet network such as a Lossless Ethernet network. FCoE allows consolidation by mapping FC frames in Ethernet frames and by replacing physical Fibre Channel links with virtual links. A Lossless Ethernet network includes full duplex Ethernet links connecting bridges and devices implementing specific extensions to avoid frames loss due to congestion situations. A SAN supporting FCoE may include Ethernet-only devices, FC-only devices, and devices that support both Fibre Channel and Ethernet.

However, mechanisms for discovering devices in FCoE environments are limited. Consequently, it is desirable to provide improved methods and apparatus for performing discovery in FCoE environments.

BRIEF DESCRIPTION OF THE DRAWINGS

The disclosure may best be understood by reference to the following description taken in conjunction with the accompanying drawings, which illustrate particular example embodiments.

FIG. 4 illustrates a particular example of a solicitation message from an ENode.

FIG. 5 illustrates a particular example of a solicitation message from an FCF.

FIG. 6 illustrates a particular example of an advertisement message.

DESCRIPTION OF PARTICULAR EMBODIMENTS

Figure 1:
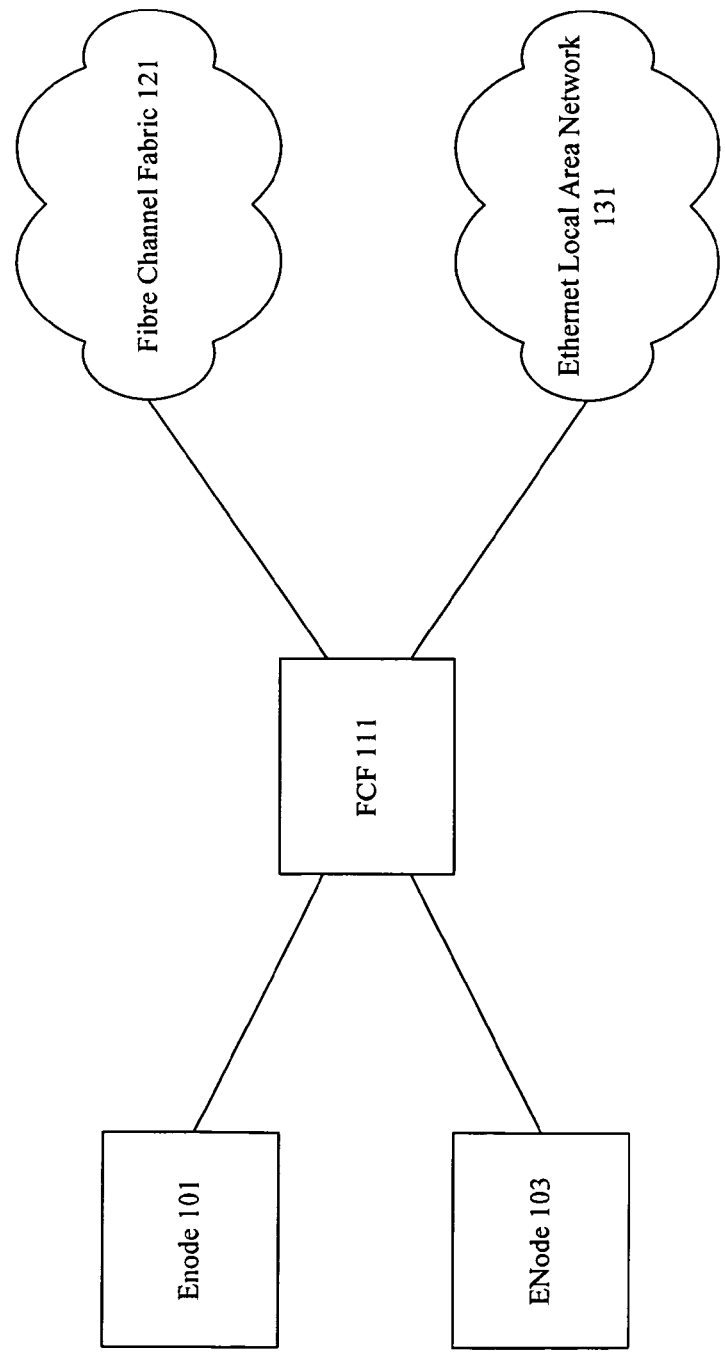
FIG. 1 illustrates a particular example of a Fibre Channel over Ethernet (FCoE) configuration having an ENode connected to an FCF.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular applications and switches. However, it should be noted that the techniques of the present invention apply to a variety of different applications and switches. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques are provided for performing discovery in a Fibre Channel over Ethernet (FCoE) network. An FCoE Node (ENode) discovers the FCoE Forwarders (FCFs) connected to its network segment by transmitting a solicitation message to the multicast MAC address "All-FCF-MACs". All FCFs receive frames destined for this multicast MAC address, including the solicitation message that announces the presence of the ENode. Each FCF replies with a unicast advertisement message that provides the ENode with a MAC address of the responding FCF. The ENode builds a list of the FCFs available on its network segment and may then establish a virtual link with one or more of the FCFs through a Fabric Login (FLOGI) exchange.

Example Embodiments

According to various embodiments, Fibre Channel distinguishes end systems (referred to as Nodes) and intermediate systems (referred to as Switches). FCoE end systems are referred to herein as ENodes (FCoE Nodes) while FCoE intermediate systems are referred to herein as FCFs (FCoE Forwarders).

According to various embodiments, Fibre Channel ports of Fibre Channel Nodes are designated as N_Ports (i.e., Node Ports). Fibre Channel ports of Fibre Channel Switches are designated as F_Ports (i.e., Fabric Ports, connected to N_Ports) or E_Ports (i.e., Expansion Ports, connecting two Switches). Fibre Channel defines the behavior of a connection between a Node and a Switch as an N_Port to F_Port link, and the behavior of a connection between two Switches as an E_Port to E_Port link. With FCoE these constructs become virtual, because ports of ENodes and FCFs are Ethernet ports. In particular examples, an ENode may have one or more Ethernet ports, each associated to a Lossless MAC (Media Access Control) function. An FCF may have one or more Ethernet ports, associated to one or more Lossless MAC functions. Each MAC has an associated MAC address. In particular embodiments, a Lossless MAC of an ENode is able to instantiate one or more VN_Port (Virtual N_Port). A Lossless MAC of an FCF is able to instantiate one or more VF_Ports (Virtual F_Ports), one or more VE_Ports (Virtual E_Ports), or both VF_Ports and VE_Ports. FCoE defines the behavior of a logical connection between an ENode and an FCF as a VN_Port to VF_Port virtual link, and the behavior of a logical connection between two FCFs as a VE_Port to VE_Port virtual link.

Fibre Channel links are generally full-duplex and point-to-point. A point-to-point link may connect only two systems. Therefore, as an example, when an N_Port is connected to an F_Port, the N_Port may perform its initialization functions (e.g., the FLOGI process to receive from the Switch a Fibre Channel address identifier) just sending frames into the link, because only the F_Port at the other end of the link receives those frames. The same is true when connecting two FC Switches.

FCoE changes this situation, because an Ethernet network such as a Lossless Ethernet network to which FCoE systems may be connected behaves inherently as a multi-access link, rather than as a point-to-point one. In particular topologies and configurations (e.g., when an ENode is directly connected through a point-to-point link to an FCF) the Ethernet network may behave as a point-to-point link and operations can be performed in a way similar to the native Fibre Channel case. However, in the general case, there may be multiple ENodes and multiple FCFs connected to the same Ethernet network.

Techniques are provided for performing discovery in a Fibre Channel over Ethernet (FCoE) network. A Lossless Ethernet MAC of an ENode supports VN_Ports (i.e., it is capable of instantiating VN_Ports). A Lossless Ethernet MAC of an FCF (referred to as FCF-MAC) may support VE_Ports only, VF_Ports only, or both VE_Ports and VF_Ports. VE_Port capable FCF-MACs need to discover other VE_Port capable FCF-MACs, while VF_Port capable FCF-MACs need to be discovered by ENodes' Lossless Ethernet MACs. Therefore the FCoE Discovery actions performed by an FCF depend on the capabilities supported by an FCF-MAC.

According to various embodiments, when an ENode's Lossless Ethernet MAC becomes operational, that ENode's MAC needs to discover the VF_Port capable FCF-MACs connected to its network segment in order to establish VN_Port to VF_Port virtual links. To discover the VF_Port capable FCF-MACs connected to its network segment, the ENode's MAC transmits a Solicitation message to a multicast MAC address such as "All-FCF-MACs". All FCF-MACs listen to this multicast MAC address and therefore receive Ethernet frames destined to it. Therefore each VF_Port capable FCF-MAC connected to the ENode's network segment receives that Solicitation message, announcing the presence of the ENode and requesting each VF_Port capable FCF-MAC to reply. Each VF_Port capable FCF-MAC replies with a unicast Advertisement message carrying its MAC address. It should be noted that capitalized messages refer to specific messages in a particular protocol, whereas lower case messages refer to more generalized messages. For example, Advertisement messages and Solicitation messages refer to specific messages in a particular version of the FCoE protocol, whereas advertisement and solicitation messages are more generalized messages that may be referred to by different names in different versions and variations of a protocol. Unicast solicited Advertisements (i.e., Advertisements sent in response to a Solicitation message) are jumbo Ethernet frames (i.e., they are padded to the maximum FCoE frame size, that is bigger than the standard Ethernet maximum frame size) to verify the Lossless Ethernet network properly supports the size required by FCoE. On receiving Advertisements the ENode's MAC builds a list of the VF_Port capable FCF-MACs available on its network segment and may then establish VN_Port to VF_Port virtual links with one or more of them through a Fabric Login (FLOGI) exchange.

In particular embodiments, in a similar way, when a VE_Port capable FCF-MAC becomes operational, that FCF-MAC needs to discover the VE_Port capable FCF-MACs connected to its network segment in order to establish VE_Port to VE_Port virtual links. To discover the VE_Port capable FCF-MACs connected to its network segment, the FCF-MAC transmits a Solicitation message to the multicast MAC address "All-FCF-MACs". All FCF-MACs listen to this multicast MAC address and therefore receive Ethernet frames destined to it. Therefore each VE_Port capable FCF-MAC connected to that FCF-MAC's network segment receives that Solicitation message, that announces the presence of the FCF-MAC and requests each other VE_Port capable FCF-MAC to reply. Each VE_Port capable FCF-MAC replies with a unicast Advertisement message carrying its MAC address. Unicast solicited Advertisements (i.e., Advertisements sent in response to a Solicitation message) are jumbo Ethernet frames (i.e., they are padded to the maximum FCoE frame size, that is bigger than the standard Ethernet maximum frame size) to verify the Lossless Ethernet network properly supports the size required by FCoE. On receiving Advertisements the VE_Port capable FCF-MAC builds a list of the VE_Port capable FCF-MACs available on its network segment and may then establish VE_Port to VE_Port virtual links with each of them through an ELP exchange.

Fibre Channel over Ethernet (FCoE) allows consolidation of Storage Area Networks (SANs) based on the Fibre Channel (FC) protocol over Ethernet Networks. FCoE enables this consolidation by mapping FC frames in Ethernet frames and by replacing physical Fibre Channel links with virtual links over Ethernet. A virtual link is defined by the pair of Ethernet MAC addresses identifying the two Ethernet MACs connected by the virtual link. A SAN supporting FCoE may include Ethernet-only devices, FC-only devices, and devices that support both Fibre Channel and Ethernet. Devices that support only Ethernet process FCoE frames as Ethernet frames. Devices that support FCoE can extract the Fibre Channel frames encapsulated in FCoE frames as appropriate and process them as Fibre Channel frames.

According to various embodiments, one problem with FCoE is how ENodes discover FCFs and how FCFs discover other FCFs. In Fibre Channel, Nodes often are connected directly to a Fibre Channel Switch through unimpeded point-to-point links. The Fabric Login (FLOGI) process assumes a point-to-point link. Similarly, Switches are connected directly to other Switches through unimpeded point-to-point links. The ELP process between Switches similarly assumes a point-to-point link. The FLOGI and ELP processes respectively establish the operating parameters of the physical point-to-point link that connects a FC Node to a FC Switch or a FC Switch to another FC Switch. The FLOGI and FDISC processes allow an FC Node connected to an FC Switch to obtain one or more address identifiers. However, in an FCoE deployment there is no guarantee that connections between ENodes and FCFs or connections between FCFs are pointto-point and unimpeded. For example, a number of Ethernet bridges may reside between an ENode and an FCF, or between FCFs. An ENode may not know the MAC address of the FCF to which send an FLOGI or FDISC message and an FCF may not know the MAC address of the FCF to which send an ELP message, as the Ethernet bridges are transparent to ENodes and FCFs, and allow for a variety of connectivity configurations that are not possible in native Fibre Channel.

For ENodes, a solution is to augment the FLOGI and FDISC processes to take into account some connectivity configurations. According to particular embodiments, the existing FLOGI process may perform some discovery functions. In one example, an FCoE encapsulated FLOGI Request uses an "anycast" MAC address, a unicast MAC address belonging to any FCF present in a network, as the destination MAC address. If an ENode is directly connected to an FCF, the FCF recognizes such a MAC address as one of its own MAC addresses and processes the FCoE frame carrying the FLOGI Request. If an ENode is not directly connected to an FCF, but is connected to an intermediate Ethernet bridge to which one FCF is also connected, the intermediate Ethernet bridge floods the FCoE frame carrying the FLOGI Request over the Ethernet network, delivering it to the FCF, which is then able to process the FCoE encapsulated FLOGI Request. In both cases, the FCF learns the MAC address of the ENode's MAC from the source MAC address field of the FCoE frame carrying the FLOGI Request and uses it to reply to the ENode. In particular, the FCF uses the MAC address of the ENode as destination MAC address of the FCoE frame encapsulating the FLOGI Accept, and its appropriate FCF-MAC address as the source MAC address. On receiving the FCoE encapsulated FLOGI Accept, the ENode learns from the source MAC address field of the FCoE encapsulated FLOGI Accept the MAC address of the FCF, and will use it for any subsequent communication with that FCF. However, this technique works properly only in the constrained configuration in which there is a single FCF connected to the intermediate Ethernet bridge. If more than one FCF are connected to it, they will all receive the FCoE Encapsulated FLOGI Request, and some complex coordination protocol among FCFs becomes necessary in order to establish which FCF will reply to the FCoE encapsulated FLOGI Request.

Augmenting the existing FLOGI process to perform some discovery functions is simple, but allows only constrained connectivity configurations. In many instances, these constrained configurations are neither acceptable nor enforceable. Consequently, the techniques and mechanisms of the present invention provide techniques for separating the discovery process from the FLOGI, FDISC, and ELP processes. According to particular embodiments, before performing any FLOGI, an ENode sends a Solicitation message having a multicast address ("All-FCF-MACs") as destination MAC address and its own universal MAC address as source MAC address. All FCFs listen to this multicast MAC address. The solicitation is forwarded by Ethernet bridges and is received for processing by all the FCFs connected over the same Ethernet network segment. All FCFs can learn the MAC address of the soliciting ENode from the source MAC address field of the Solicitation message. According to particular embodiments, each FCF (or a subset of them) replies with a unicast Advertisement having the appropriate FCF-MAC address as source MAC address and the learned MAC address of the soliciting ENode as destination MAC address. On receiving the Advertisement the ENode learns the FCF-MAC address to be used for any subsequent communication with the advertising FCF. Processing the received Advertisements, the ENode builds a list of the FCF-MACs it can reach over the Ethernet network segment to which it is connected. According to particular embodiments, the ENode sends a unicast FCoE encapsulated FLOGI Request to one or more of the available FCF-MACs to establish virtual links with them. The ENode can also send unicast FCoE encapsulated FDISC Requests to one or more of the available FCF-MACs for obtaining additional address identifiers.

In particular embodiments, FCF-MACs send a multicast Advertisement with a multicast address "All-ENodes" to allow discovery of newly connected FCFs. Solicitation and Advertisement messages can be implemented as FCoE encapsulated frames or as a different protocol directly layered over Ethernet. Solicitation and Advertisement messages allow both ENodes and FCFs to discover FCFs connected in a wide variety of configurations.

FIG. 1 illustrates one particular example of an FCoE network. An ENode 101 has a direct unimpeded connection with an FCF 111. An ENode 103 also has a direct unimpeded connection with an FCF 111. The FCF 111 is connected to a Fibre Channel Fabric 121 and an Ethernet Local Area Network (LAN) 131. In this configuration, ENodes 101 and 103 may each discover which MAC address to use in order to communicate with FCF 111 by augmenting the FLOGI process. However, there is no way to enforce a topology where ENodes 101 and 103 are connected in a direct and unimpeded manner to an FCF in an FCoE network. For example, ENodes 101 and 103 would not even know if there were intermediate Ethernet bridges between them and the FCF 111.

Figure 2:
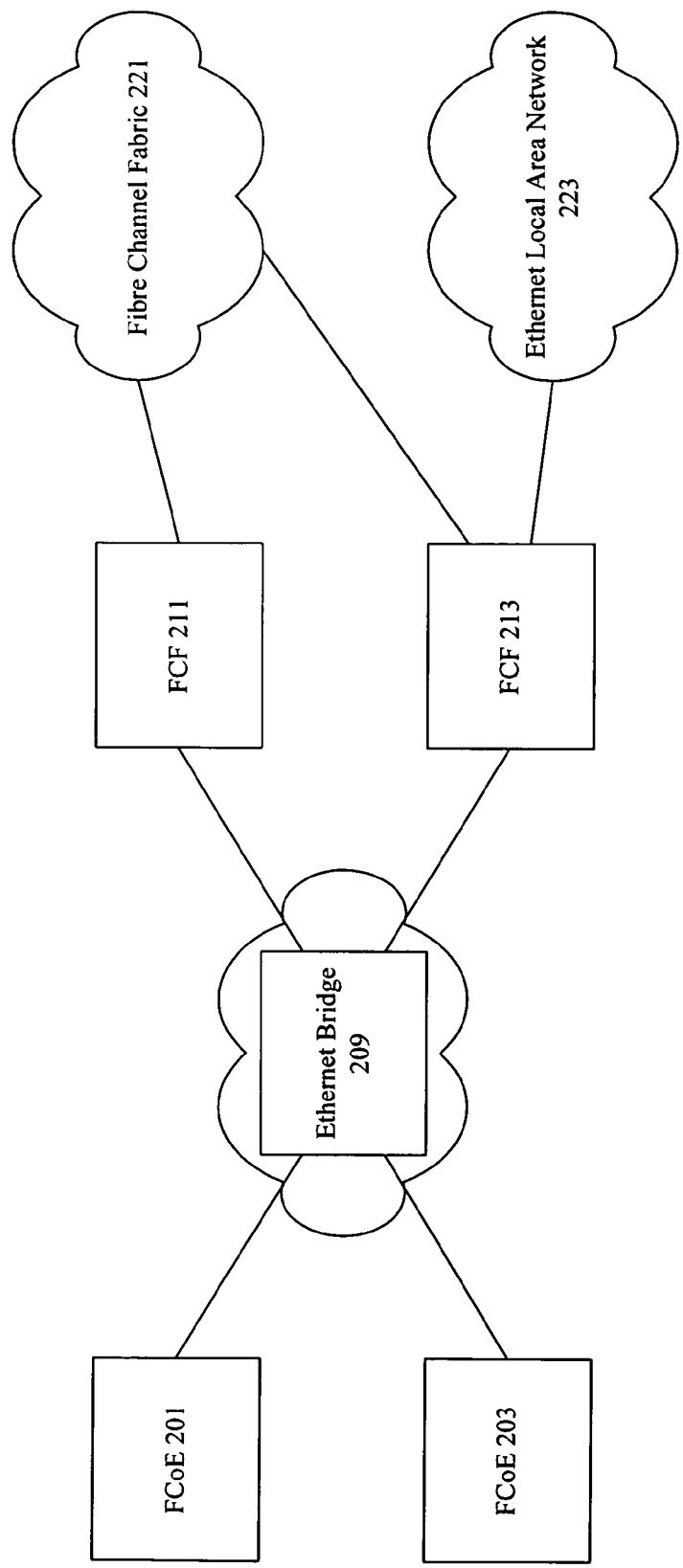
FIG. 2 illustrates a particular example of an FCoE configuration having an ENode connected to an FCF through an Ethernet bridge.

FIG. 2 illustrates one particular example of an FCoE network having an intermediate Ethernet bridge between ENodes and FCFs. An ENode 201 has a connection to FCFs 211 and 213 through and Ethernet bridge 209. Similarly, an ENode 203 has a connection to FCFs 211 and 213 through an Ethernet bridge 209. FCoE allows for multiple virtual links between ENodes 201 and 203 and FCFs 211 and 213. Processes such as FLOGI and FDISC assume that links are direct and unimpeded. With an Ethernet bridge 209 that may be within an Ethernet cloud, an ENode 201 does not know to which MAC address send an FLOGI Request nor which FCF will reply to the FLOGI Request, as the Ethernet bridge 209 may be connected to numerous ENodes and numerous FCFs. Consequently, a discovery protocol is needed to discover network configuration information. The discovery protocol is composed of Solicitation messages and of Advertisement messages.

Figure 3A:
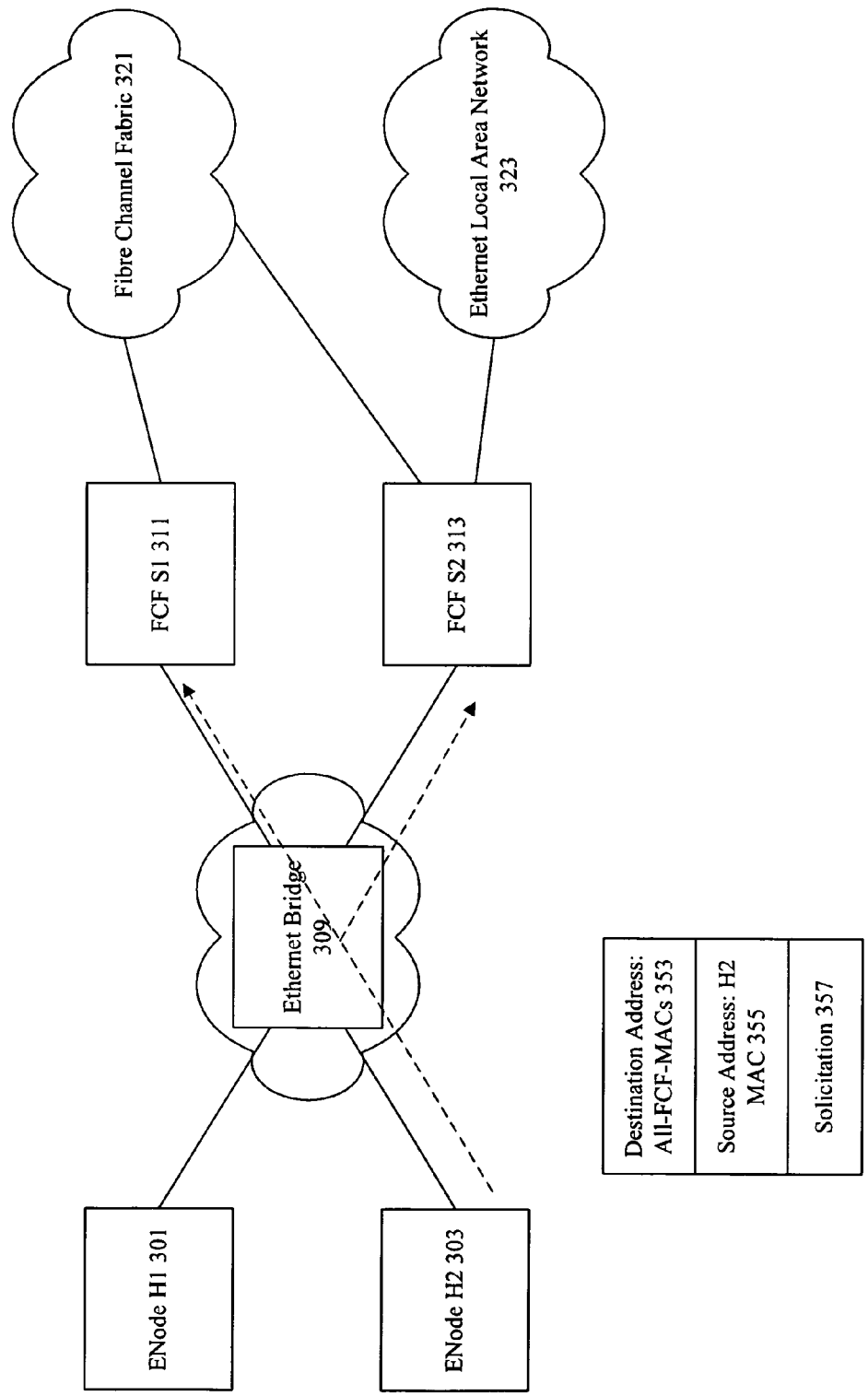
FIG. 3a-d illustrate particular examples of messages transmitted between ENodes and FCFs.

FIG. 3A illustrates one particular example of FCoE Solicitations. The FCoE network includes ENodes H1 301 and H2 303. The ENodes H1 301 and H2 303 are connected to the FCFs S1 311 and S2 313 through the Ethernet bridge 309. FCFs S1 311 and S2 313 are connected to Fibre Channel Fabric 321 while FCF S2 313 is connected to Ethernet Local Area Network (LAN) 323. According to particular embodiments, ENodes H1 301 and H2 303 have Ethernet ports that send Solicitations to a multicast address. In particular embodiments, the multicast address is "All-FCF-MACs" 353. The Solicitations also carry a source MAC address corresponding to an ENode such as ENode H2 303 with MAC address 355. According to particular embodiments, the source and destination addresses 355 and 353 are included in an Ethernet header while the Solicitation 357 is itself included in an encapsulated Fibre Channel frame. In particular embodiments, a Solicitation from ENode H2 303 is sent over a physical Ethernet link connected to Ethernet bridge 309, which then forwards the Solicitation to FCFs S1 311 and S2 313. In particular embodiments, an Ethernet network composed of more than one Ethernet bridge may be present between ENodes and FCFs.

Figure 3B:
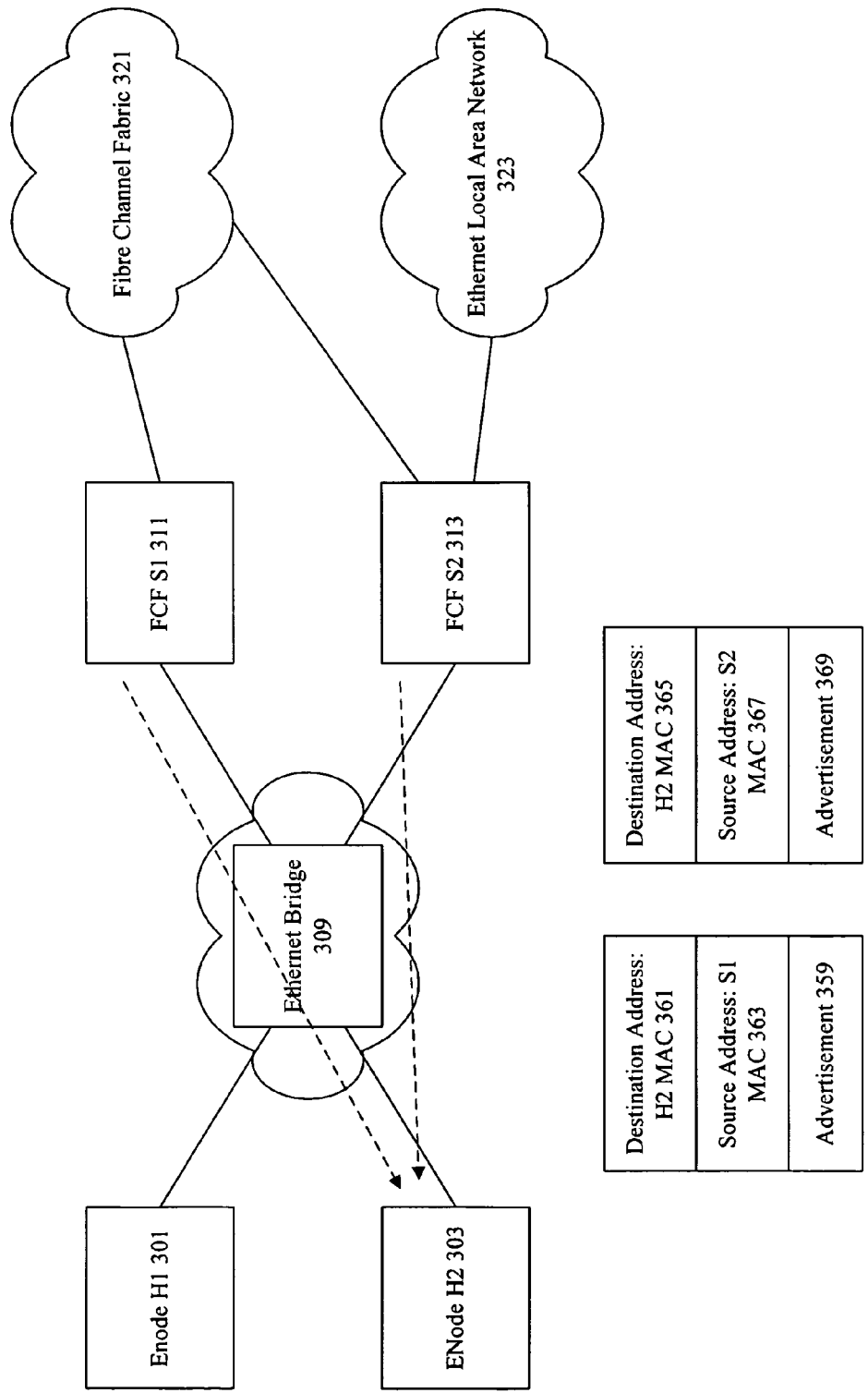

FIG. 3B illustrates one particular example of FCoE Advertisements. The FCoE network includes ENodes H1 301 and H2 303. The ENodes H1 301 and H2 303 are connected to the FCFs S1 311 and S2 313 through the Ethernet bridge 309. FCFs 311 and 313 are connected to Fibre Channel Fabric 321 while FCF S2 313 is connected to Ethernet Local Area Network (LAN) 323. According to particular embodiments, after having received a Solicitation from ENode H2 303, FCFs S1 311 and S2 313 reply each with a unicast Advertisement. In particular embodiments, the Advertisement 359 is encapsulated in an Ethernet frame having destination address H2 MAC 361 and source address S1 MAC 363. The advertisement 369 is encapsulated in an Ethernet frame having destination address H2 MAC 365 and source address S2 MAC 367. On receiving Advertisements, ENode H2 builds, per each port, a list of the FCFs reachable through that port, each FCF being associated with its appropriate FCF-MAC address. The ENode is then able to establish virtual links with one or more of the listed FCFs through the FLOGI process. The ENode may subsequently acquire additional FC address identifiers through the FDISC process.

Figure 3C:
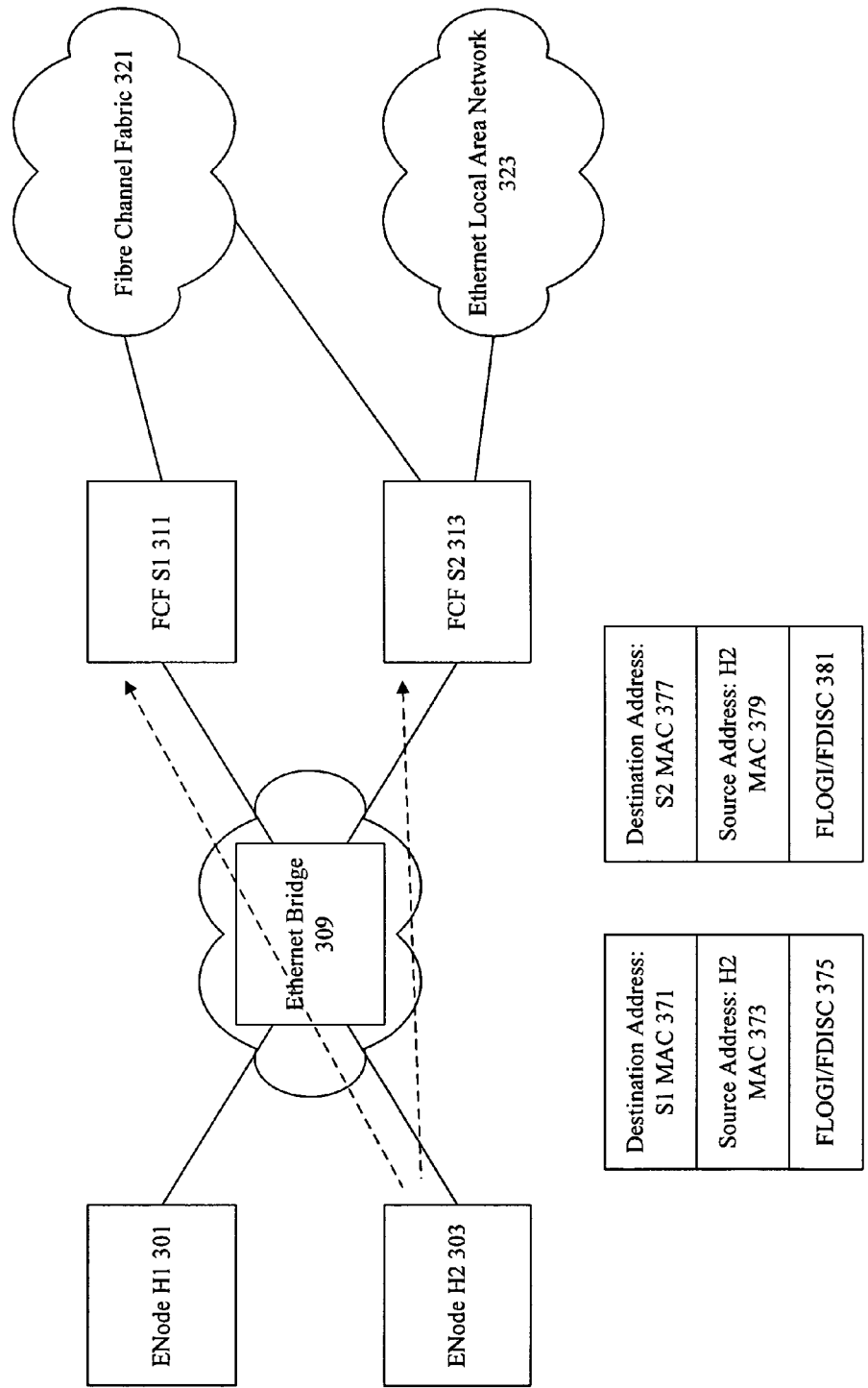

FIG. 3C illustrates one particular example of an FLOGI or FDISC Request. The FCoE network includes ENodes H1 301 and H2 303. The ENodes H1 301 and H2 303 are connected to FCFs S1 311 and S2 313 through Ethernet bridge 309. FCFs 311 and 313 are connected to Fibre Channel Fabric 321 while FCF S2 313 is connected to Ethernet Local Area Network (LAN) 323. Having discovered the FCFs reachable through one of its ports, the ENode H2 303 can then perform a unicast FLOGI with one or more of the discovered FCFs, knowing their FCF-MAC address.

According to particular embodiments, ENode H2 303 sends an FLOGI/FDISC 375 encapsulated in an FCoE frame with a destination MAC address S1 MAC 371 and a source MAC address H2 MAC 373. The ENode H2 303 may also send an FLOGI/FDISC 381 encapsulated in an FCoE frame with a destination MAC address S2 MAC 377 and a source MAC address H2 MAC 379.

Figure 3D:
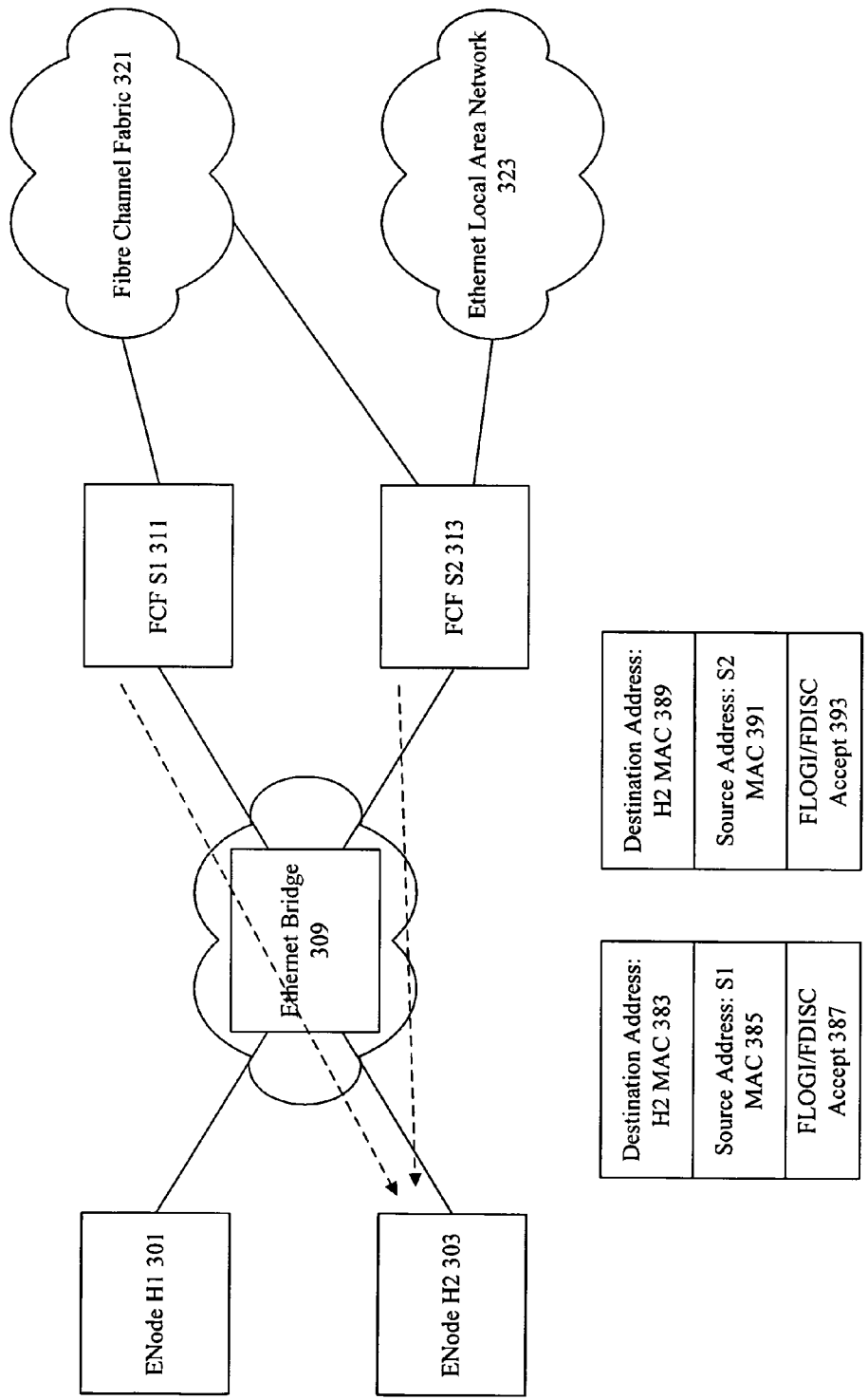

FIG. 3D illustrates one particular example of FLOGI or FDISC Accepts. The FCoE network includes ENodes H1 301 and H2 303. The ENodes H1 301 and H2 303 are connected to FCFs S1 311 and S2 313 through Ethernet bridge 309. FCFs 311 and 313 are connected to Fibre Channel Fabric 321 while FCF S2 313 is connected to Ethernet Local Area Network (LAN) 323. According to particular embodiments, FCFs S1311 and S2 313 reply to FLOGI/FDISC Requests with FLOGI/FDISC Accept messages. In particular embodiments, FCF S1 311 replies to an FLOGI/FDISC Request from ENode H2 303 with the FLOGI/FDISC Accept 387 encapsulated in an FCoE frame with a destination MAC address H2 MAC 383 and a source MAC address S1 MAC 385. In a similar way, FCF S2 313 replies to an FLOGI/FDISC Request from ENode H2 303 with the FLOGI/FDISC Accept 393 encapsulated in an FCoE frame with a destination MAC address H2 MAC 389 and a source MAC address S2 MAC 391.

According to particular embodiments, FCFs can also periodically send multicast Advertisements to a multicast address such as "All-ENodes" to allow for discovery of a newly connected FCF. In particular embodiments, Advertisement messages may be used to carry additional information to ENodes. For example, an Advertisement message can carry the value of a Fibre Channel MAC Address Prefix (FC-MAP), a Switch_Name, and a Fabric_Name. This additional information allows an administrator to have more information about a particular network and may be used to determine network anomalies. ENodes may use the FC-MAP parameter to construct FCoE mapped MAC addresses.

It should also be noted that although the discovery mechanisms shown in FIG. 3A-3D were shown for ENodes, the same mechanisms may also be used by FCFs to discover each other. In particular embodiments, an FCF-MAC can send a Solicitation to a multicast MAC address carrying its own MAC address along with other parameters. In particular embodiments, the multicast MAC address may be "All-FCF-MACs". Each FCF-MAC replies with a unicast advertisement carrying its own MAC address and other parameters. On receiving Advertisements, the soliciting FCF-MAC generates a list of the reachable FCF-MACs. It is then possible for an FCF-MAC to establish VE_Port to VE_Port virtual links with the discovered FCF-MACs through the ELP process. FCF-MACs can also periodically send multicast Advertisements to the address "All-FCF-MACs" to allow discovery of a newly connected FCF.

FIG. 4 illustrates one example of a format for a Solicitation message from an ENode. According to particular embodiments, the Solicitation message includes an FCoE discovery command code 401, a version number 403, an operation code 405, a descriptor list length 407, and a descriptor list. Flags 409 include an "FCF" flag 411 that indicates that the message is a Solicitation message from an ENode when set to zero. Each descriptor is defined in a generic way, as a Type, Length, Value (TLV) triplet. In particular embodiments, the descriptor list of a Solicitation message generated by an ENode may include only a descriptor, the MAC address descriptor, carrying the MAC address 425 of the ENode's MAC sending the Solicitation. The Solicitation message may be defined as an Extended Link Service (ELS) encapsulated in an FCoE frame, or as a native Ethernet protocol.

FIG. 5 illustrates one example of a format for a Solicitation message from an FCF. According to particular embodiments, the Solicitation message includes an FCoE discovery command code 501, a version number 503, an operation code 505, a descriptor list length 507, and a descriptor list. Flags 509 include an "FCF" flag 511 that indicates that the message is a Solicitation message from an FCF when set to one. Each descriptor is defined in a generic way, as a Type, Length, Value (TLV) triplet. According to particular embodiments, Solicitation messages from FCFs may include more descriptors than Solicitation messages from ENodes.

In particular embodiments, the descriptor list of a Solicitation message generated by an FCF may include the MAC address descriptor, the FC-MAP descriptor, and the Switch_Name descriptor. The MAC address descriptor carries the MAC address 525 of the FCF-MAC sending the Solicitation. The FC-MAP descriptor carries the FC-MAP prefix 535 used to construct FCoE Mapped MAC addresses. The Switch_Name descriptor carries the Switch_Name 545 of the FCF. In some embodiments, the additional information enables the other FCFs to verify the network configuration is proper.

FIG. 6 illustrates one example of a format for an Advertisement message from an FCF. According to particular embodiments, the Advertisement message includes an FCoE discovery command code 601, a version number 603, an operation code 605, a descriptor list length 607, and a descriptor list. Flags 609 include a "solicited" flag 611 that indicates if the Advertisement is being sent is response to a Solicitation when set to one. Each descriptor is defined in a generic way, as a Type, Length, Value (TLV) triplet.

In particular embodiments, the descriptor list of an Advertisement message may include the MAC address descriptor, the FC-MAP descriptor, the Switch_Name descriptor, and the Fabric_Name descriptor. The MAC address descriptor carries the MAC address 625 of the FCF-MAC originating the Advertisement. The FC-MAP descriptor carries the FC-MAP prefix 635 used to construct FCoE Mapped MAC addresses. The Switch_Name descriptor carries the Switch_Name 645 of the FCF. The Fabric_Name descriptor carries the Fabric_Name 655 of the Fabric to which the FCF belongs. In some embodiments, the additional information enables the ENodes and the other FCFs to verify the network configuration is proper.

In particular embodiments, solicited Advertisements (i.e., Advertisements generated in response to Solicitation messages) are padded to the maximum frame size supported by FCoE. This allows to verify that the Lossless Ethernet cloud connecting ENodes and FCFs supports the Ethernet jumbo frame size appropriate for FCoE, that is bigger than the standard maximum Ethernet frame size.

Figure 7A:
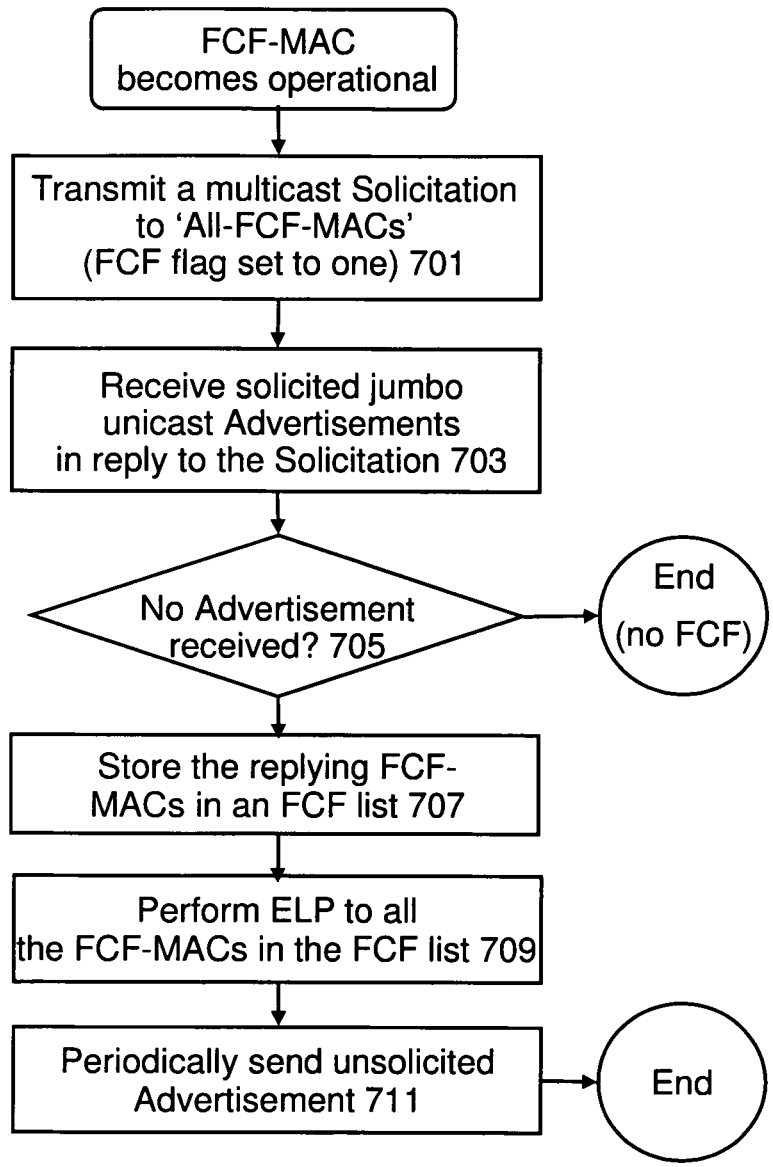
FIGS. 7a-e illustrate particular examples of FCF processing.

FIGS. 7a-7e illustrate particular examples of FCF processing. FIG. 7a illustrates one particular example of a VE_Port capable FCF-MAC becoming operational. According to various embodiments, discovery of other VE_Port capable FCF-MACs connected to the same Lossless Ethernet segment is performed. At 701, a VE_Port capable FCF-MAC transmits a multicast Solicitation to 'All-FCF-MACs' (with the FCF flag set to one). At 703, it receives jumbo unicast Advertisements. If no Advertisement is received at 705, processing completes. Otherwise, the discovered VE_Port capable FCF-MACs are stored in an FCF list at 707. At 709, it performs ELP and Fabric configuration with the FCF-MACs in the FCF list. At 711, it periodically sends unsolicited non-jumbo Advertisements to the address "All-FCF-MACs".

Figure 7B:
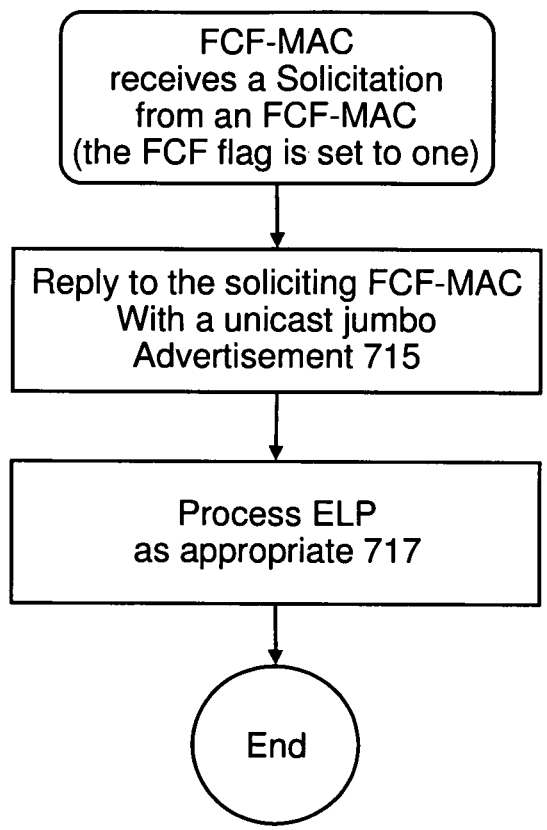

When a VE_Port capable FCF-MAC receives a Solicitation from another VE_Port capable FCF-MAC (i.e., a Solicitation having the FCF flag set to one) as shown in FIG. 7b, it replies to the soliciting FCF-MAC with a unicast jumbo Advertisement at 715. It processes ELP and Fabric configuration as appropriate at 717.

Figure 7C:
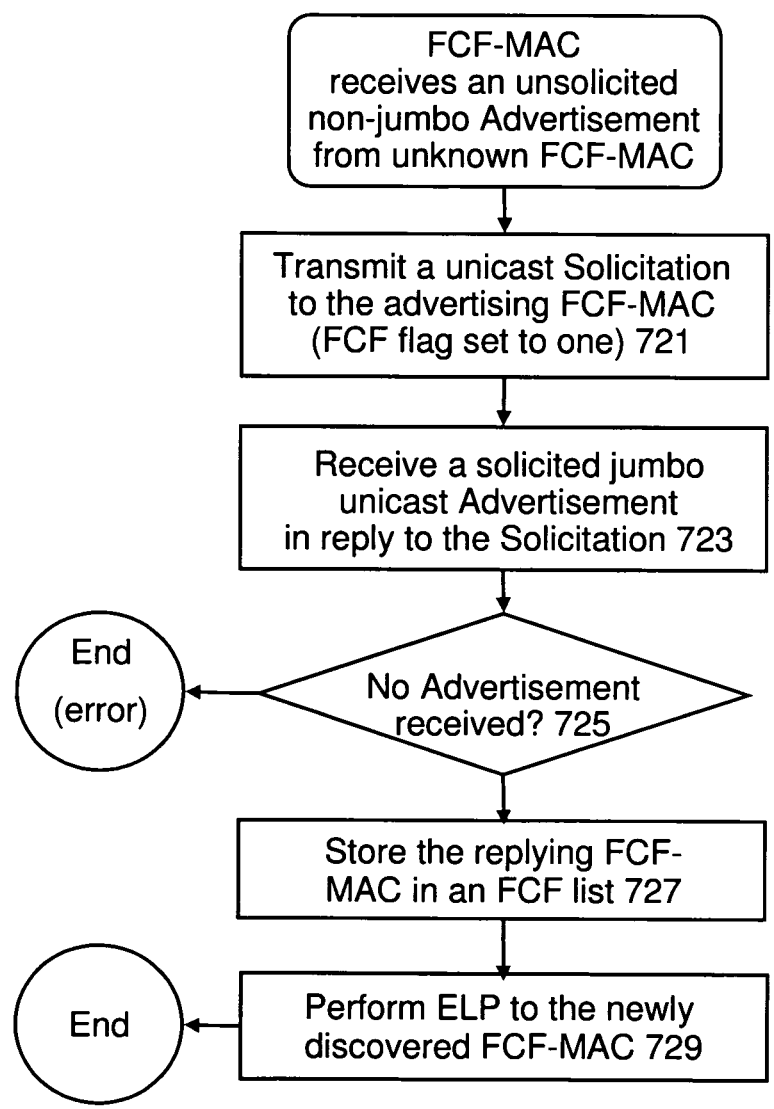

FIG. 7c illustrates one particular example of a VE_Port capable FCF-MAC receiving an unsolicited non-jumbo Advertisement from an unknown VE_Port capable FCF-MAC. At 721, the VE_Port capable FCF-MAC transmits a unicast Solicitation to the advertising FCF-MAC with the FCF flag set to one. At 723, the FCF-MAC receives a solicited jumbo unicast Advertisement in reply to the Solicitation. If no Advertisement is received at 725, processing completes. Otherwise, the discovered and verified VE_Port capable FCF-MAC is stored in an FCF list at 727. At 729, it performs ELP and Fabric configuration with the newly discovered and verified VE_Port capable FCF-MAC.

Figure 7D:
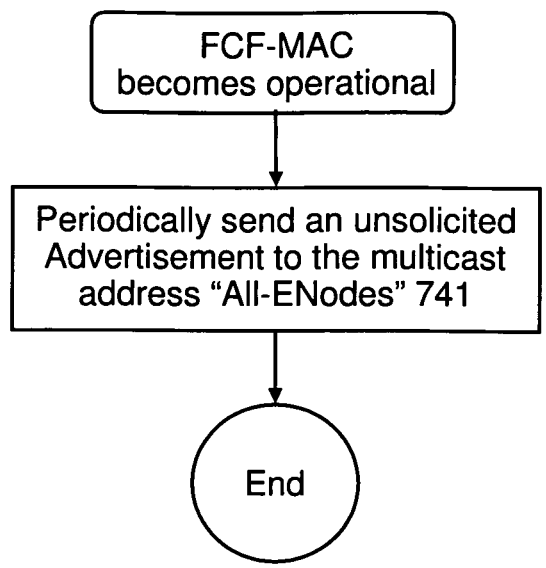

FIG. 7d shows a particular example of a VF_Port capable FCF-MAC becoming operational. At 741, the VF_Port capable FCF-MAC periodically sends an unsolicited non-jumbo Advertisement to the multicast address "All-ENodes".

Figure 7E:
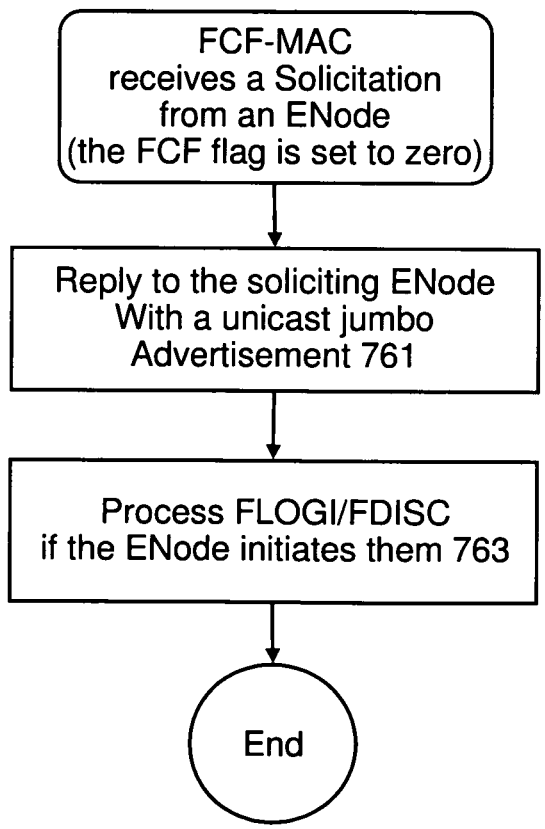

When a VF_Port capable FCF-MAC receives a Solicitation from an ENode (i.e., a Solicitation having the FCF flag set to zero) as shown in FIG. 7e, it replies to the soliciting ENode with a unicast jumbo Advertisement at 761. It processes FLOGI/FDISC if the ENode initiates them at 763.

Figure 8A:
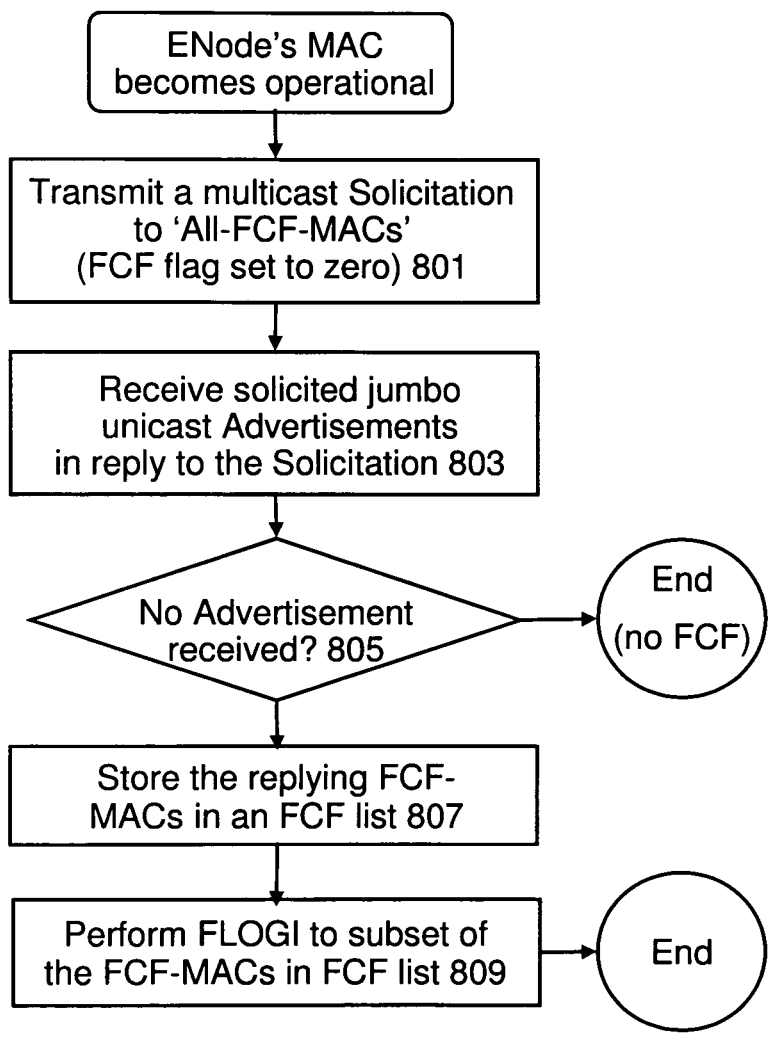
FIG. 8a-b illustrate particular examples of ENode processing.

FIG. 8a illustrates one particular example of ENode processing. The ENode discovers VF_Port capable FCF-MACs connected to the same Lossless Ethernet segment. At 801, the ENode transmits a multicast Solicitation to 'All-FCF-MACs' (a Solicitation with the FCF flag set to zero). At 803, it receives jumbo unicast Advertisements. If no Advertisement is received at 805, processing ends. If one or more Advertisements are received, the advertising FCF-MACs are stored in an FCF list at 807. At 809, it performs FLOGI and/or FDISC with a subset of the FCF-MACs in the FCF list.

Figure 8B:
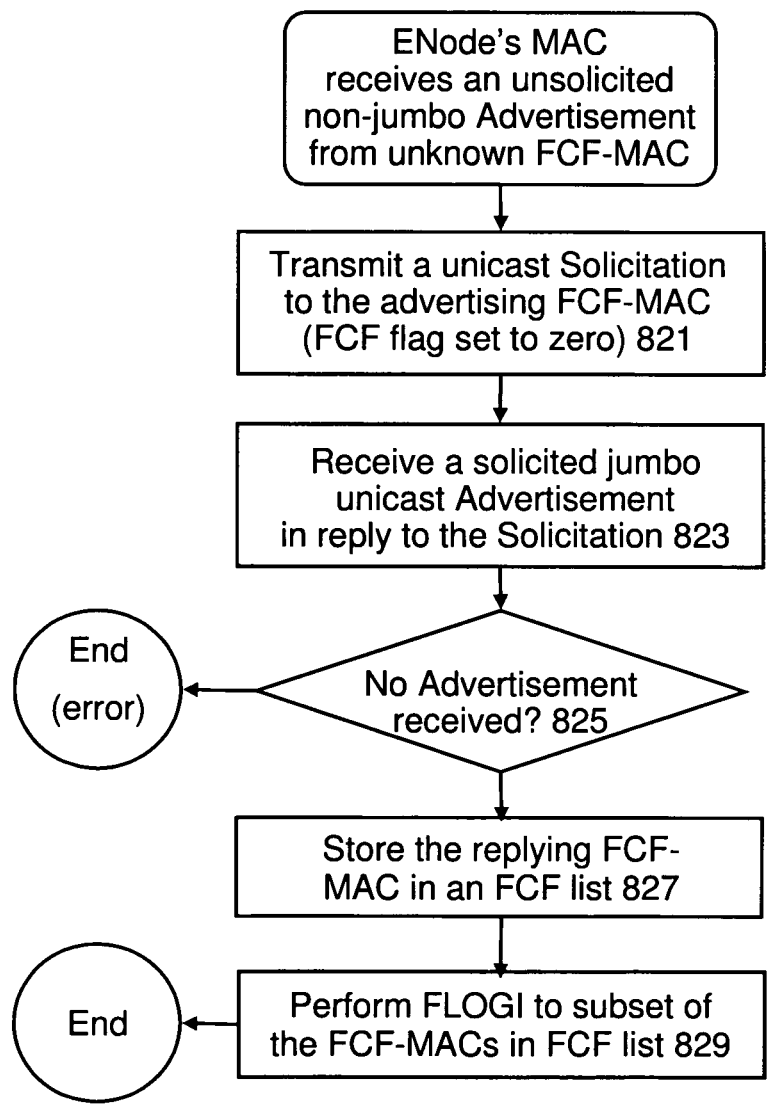

FIG. 8b illustrates another particular example of ENode processing. An ENode MAC receiving an unsolicited non-jumbo Advertisement sent to the multicast address "All-ENodes" from an unknown VF_Port capable FCF-MAC. At 821, the ENode transmits a unicast Solicitation to the advertising VF_Port capable FCF-MAC. At 823, it receives a solicited jumbo unicast Advertisement in reply to the Solicitation 821. If no Advertisement is received at 825, processing ends. Otherwise, that verified FCF-MAC is stored in an FCF list at 827. At 829, the ENode's MAC may perform FLOGI and/or FDISC to the newly discovered and verified VF_Port capable FCF-MAC.

Figure 9:
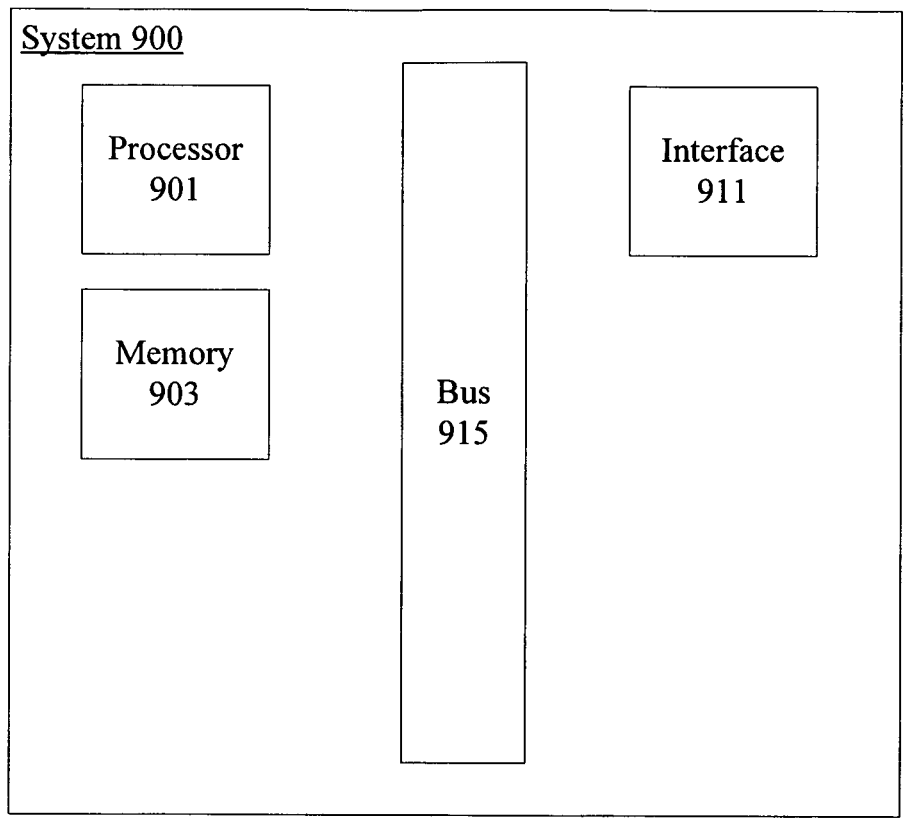
FIG. 9 illustrates a particular example of a device.

A variety of devices and applications can implement particular examples of discovery. FIG. 9 illustrates one example of a device.

According to particular example embodiments, a system 900 suitable for implementing particular embodiments of the present invention includes a processor 901, a memory 903, an interface 911, and a bus 915 (e.g., a PCI bus). When acting under the control of appropriate software or firmware, the processor 901 is responsible for such tasks such as pattern generation. Various specially configured devices can also be used in place of a processor 901 or in addition to processor 901. The complete implementation can also be done in custom hardware. The interface 911 is typically configured to send and receive data packets or data segments over a network. Particular examples of interfaces the device supports include host bus adapter (HBA) interfaces, Ethernet interfaces, frame relay interfaces, cable interfaces, DSL interfaces, token ring interfaces, and the like.

According to particular example embodiments, the system 900 uses memory 903 to store data and program instructions. The program instructions may control the operation of an operating system and/or one or more applications, for example. The memory or memories may also be configured to store received packets, bindings, Keep-Alive states, periodicity information for monitored session packets, Flow-Through and/or Flow-Around configurations, etc.

Because such information and program instructions may be employed to implement the systems/techniques described herein, the present invention relates to tangible, machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:
1. A method, comprising:
   by a node of a Fibre Channel over Ethernet (FCoE) network:
   transmitting an FCoE solicitation message to a plurality of FCoE Forwarders (FCFs) using a multicast destination address, the plurality of FCFs being connected over a network segment associated with the node;
   receiving a unicast FCoE advertisement message from each of the plurality of FCFs in response to the solici- tation message, each advertisement message including an address of a corresponding one of the plurality of FCFs;

maintaining, for each of a plurality of ports of the node, FCF-MAC address information associated with FCFs reachable through the respective port, the FCF-MAC addresses information being obtained from the advertisement messages received from the plurality of FCFs, wherein the address information is maintained for use in subsequent communications with at least some of the plurality of FCFs; and performing a FLOGI process with a subset of the plurality of FCFs, wherein the FLOGI process is performed using the address information.

2. The method of claim 1, further comprising performing an FDISC process with a second subset of the plurality of FCF-MACS to obtain additional Fibre Channel address information.

3. The method of claim 1, wherein the node is an ENode.

4. The method of claim 1, wherein the FCoE solicitation and advertisement messages are defined as Extended Link Service (ELS) messages encapsulated in an FCoE frame.

5. The method of claim 1, wherein the FCoE solicitation and advertisement messages are defined in a native Ethernet protocol.

6. The method of claim 1, wherein the multicast address is "All-FCF-MACs".

7. The method of claim 1, wherein the multicast address is "All-ENodes".

8. The method of claim 1, wherein the solicited unicast FCoE advertisement messages received are padded jumbo Ethernet frames.

9. The method of claim 1, wherein the FCoE solicitation and advertisement messages are defined as a list of descriptors, each defined as a tag, length, value (TLV) triplet.

10. The method of claim 3, wherein the FCoE solicitation message comprises a MAC address descriptor.

11. The method of claim 1, wherein the FCoE solicitation message comprises a MAC address descriptor, a FC-MAP descriptor, and a Switch_Name descriptor.

12. The method of claim 1, wherein the FCoE advertisement messages carry a MAC address descriptor, a FC-MAP descriptor, a Switch_Name descriptor, and a Fabric Name descriptor.

13. The method of claim 1, wherein the FCoE solicitation message is transmitted from a FCF.

14. A method, comprising:

by a first FCoE Forwarder (FCF):

receiving a Fibre Channel over Ethernet (FCoE) solicitation message from a node, wherein the FCoE solicitation message is sent to a plurality of FCFs including the first FCF by the node;

sending an FCoE advertisement message to the node in response to the solicitation message, the advertisement message including an address corresponding to the first FCF; and receiving a FLOGI from the node, wherein the FLOGI is sent by the node using the address;

wherein the first node maintains, for each of a plurality of ports of the node, address information associated with FCFs reachable through the port, the address information being obtained from one or more received advertisement messages received, wherein the address information is maintained by the first node for use in subsequent communications with FCFs connected over a network segment associated with the node.

15. The method of claim 14, wherein the FCoE solicitation is received in a first Ethernet frame from the node, the first Ethernet frame encapsulating the FCoE solicitation message.

16. The method of claim 15, wherein the FLOGI is received in a second Ethernet frame from the first node, the second Ethernet frame generated using the address.

17. The method of claim 16, wherein the FCoE advertisement includes an FCF name and a fabric name.

18. The method of claim 16, wherein the first Ethernet frame includes the node address as a source address and a multicast address as a destination address.

19. The method of claim 16, further comprising receiving a third Ethernet frame from the node, the third Ethernet frame generated using information associated with the FCoE advertisement, wherein the third Ethernet frame encapsulates an FDISC message.

20. The method of claim 14, wherein the first FCF is connected to the node through an Ethernet bridge.

21. The method of claim 14, wherein the first FCF is connected to the node through a plurality of Ethernet nodes.

22. The method of claim 21, further comprising, by the first FCF, periodically sending multicast advertisements to allow discovery of the first FCF by a plurality of nodes.

23. An apparatus, comprising:

means for transmitting a Fibre Channel over Ethernet (FCoE) solicitation message to a plurality of FCoE Forwarders (FCFs) using a multicast destination address, the plurality of FCFs being connected over a network segment associated with a node;

means for receiving a unicast FCoE advertisement message from each of the plurality of FCFs in response to the solicitation message, each FCoE advertisement message including an FCF-MAC address of a corresponding one of the plurality of FCFs;

means for maintaining, for each of a plurality of ports of the node, FCF-MAC address information associated with FCFs reachable through the respective port, the FCF-MAC address information being obtained from the advertisement messages received from the plurality of FCFs, wherein the address information is maintained for use in subsequent communications with at least some of the plurality of FCFs;

means for performing a FLOGI process with a subset of the plurality of FCFs, wherein the FLOGI process is performed using the address information.

* * * * *